United States Patent
Munoz De Juan

(10) Patent No.: US 8,636,499 B2
(45) Date of Patent: Jan. 28, 2014

(54) EQUIPMENT FOR PRODUCING MOLECULARLY BIORIENTED TUBULAR PROFILES AND CORRESPONDING METHOD

(75) Inventor: Ignacio Munoz De Juan, Madrid (ES)

(73) Assignee: Molecor Tecnologia, S.L., Madrid (ES)

( * ) Notice: Subject to any disclaimer, the term of this patent is extended or adjusted under 35 U.S.C. 154(b) by 924 days.

(21) Appl. No.: 12/447,655

(22) PCT Filed: Jan. 18, 2007

(86) PCT No.: PCT/ES2007/070011
§ 371 (c)(1),
(2), (4) Date: Mar. 16, 2010

(87) PCT Pub. No.: WO2008/087236
PCT Pub. Date: Jul. 24, 2008

(65) Prior Publication Data
US 2010/0189833 A1 Jul. 29, 2010

(51) Int. Cl.
*B29C 49/08* (2006.01)
(52) U.S. Cl.
USPC .......................... 425/526; 425/522; 425/112
(58) Field of Classification Search
USPC .......................... 425/112, 522, 526
See application file for complete search history.

(56) References Cited

U.S. PATENT DOCUMENTS

| 4,340,344 A | 7/1982 | Aston et al. |
| 4,499,045 A * | 2/1985 | Obsomer ..................... 264/532 |
| 5,112,561 A * | 5/1992 | Dickinson .................... 264/531 |

FOREIGN PATENT DOCUMENTS

| EP | 0434276 | 6/1991 |
| ES | 8105621 | 9/1981 |
| FR | 8115427 | 8/1981 |
| GB | 7932064 | 9/1979 |
| WO | WO 9813190 | 4/1998 |
| WO | WO 02009926 | 7/2002 |

\* cited by examiner

*Primary Examiner* — Yogendra Gupta
*Assistant Examiner* — Robert J Grun
(74) *Attorney, Agent, or Firm* — K&L Gates LLP

(57) ABSTRACT

The equipment consists of a mould (1) with external heating elements (3) and with asymmetric heads (4) at the ends thereof, allowing insertion of the corresponding tubular profile or plastic tube (6) inside the already hot mould (1) at the same temperature as the actual mould (1) in order to prevent any heat exchange. The mould (1) is mounted on a support (2) that can tilt and rotate, while the heads (4) include a vacuum take-off orifice (5), fastening means (7) for the plastic tube (6), which, once inserted into the mould (1) rests on the lower generatrix of the latter, and inlet (8) and outlet (9) means for fluids for expanding the plastic tube (6) and for cooling same, the mould (1) incorporating, on the side, an inlet orifice for a lubricating fluid that facilitates removal of the plastic tube (1) once the latter has been shaped. The tube (6) expands owing to the introduction of the expander fluid through the inlet (8).

10 Claims, 1 Drawing Sheet

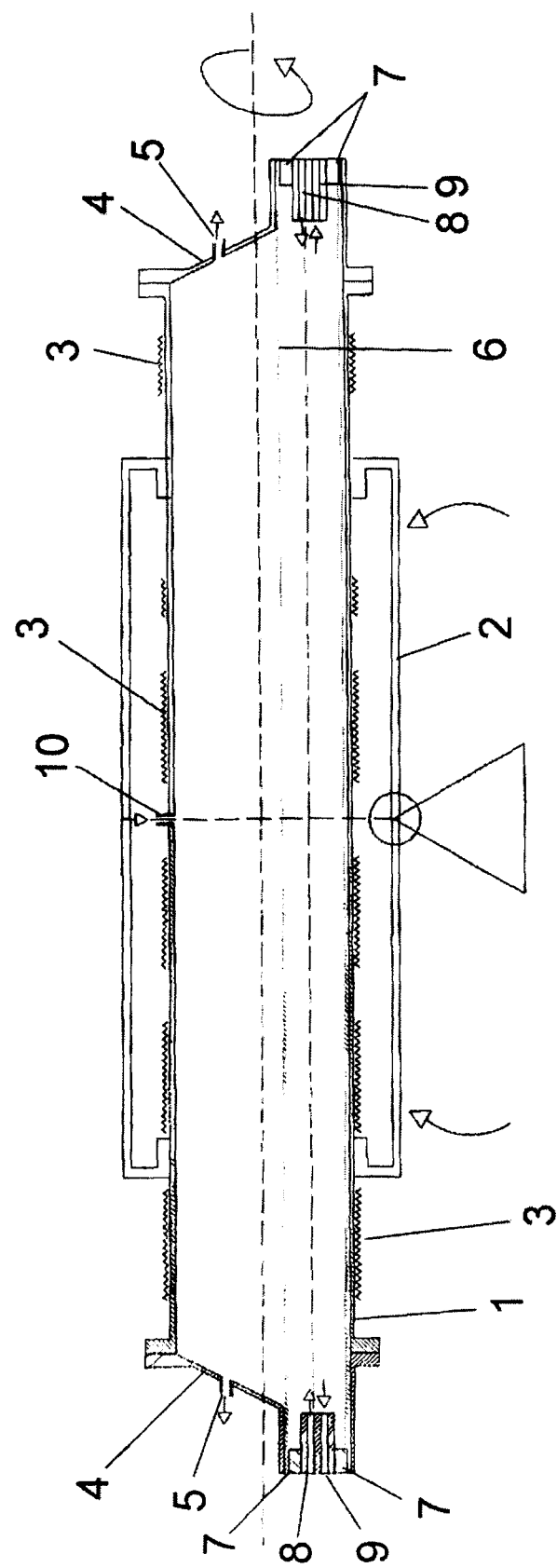

EQUIPMENT FOR PRODUCING MOLECULARLY BIORIENTED TUBULAR PROFILES AND CORRESPONDING METHOD

Some example embodiments of the present invention generally relate to equipment and a method for producing molecularly oriented tubular profiles, which can be employed in tubes, signalling elements and light structural elements. These example embodiments may be used in manufacturing processes for molecularly oriented profiles.

BACKGROUND

Molecular biorientation is a process wherein a mechanical deformation is applied to a tube or previously extruded pro forma. By employing suitable conditions, such as of temperature, pressure, rate of deformation and radius of deformation, a substantial modification of mechanical properties, such as the sigma of the material, resistance to impact, creep improvement, resistance to the propagation of cracks, improvement of the Young module, and the like, can be produced.

An ultra-resistant tube can be obtained with a molecular orientation process using fewer raw materials and providing equal or greater performance, thanks to the greater strength of the oriented material produced. In order to strengthen the tube tangentially, which is the direction in which the material should be strengthened to withstand pressure, the previously extruded tube can be radially expanded, slightly increasing the diameter of the tube.

There are various systems for manufacturing tubular profiles, and they can be grouped into two main categories: Continuous, or in-line, systems and discontinuous systems.

Some discontinuous systems will be described here. Discontinuous systems include processes which produce molecular orientation in an "element-to-element" manner based on expansion of a tubular pro forma inside a mould, the mould generally providing the final shape of the tubular profile.

Variations of discontinuous systems may include FR 8115427; U.S. Pat. No. 4,499,045, WO 98/13190, which generally describe methods wherein a hot tube is secured to the ends of the mould inside a tight sheath and is submitted to internal pressure. As the sheath is removed by axial slipping, the plastic tube expands radially and sticks to the walls of the cold mould, cooling the oriented profile by contact with the cold mould. Generally in this method, the mould is symmetrical and is comprised of two concentric bodies which slip one inside the other, the expansion is carried out in two stages and cooling is produced by contact with the walls of the mould.

U.S. Pat. No. 4,340,344 and GB 7932064 generally describe methods wherein the tube is inserted into a symmetrical mould and is heated by passing hot water inside and outside of the plastic pro forma. When the orientation temperature is reached, the interior pressure is increased and the pro forma expands into the mould. The tube is cooled, as in the previous case, by contact with the mould, as it expands, i.e. externally and indirectly. Notably, the mould is heated first with water used to heat the plastic and then the mould itself is cooled to cool the plastic, resulting in a process with a poor energy efficiency.

Methods such as are generally described in FR 8115427; U.S. Pat. No. 4,499,045, WO 98/13190, usually employ systems with internal actuators and mechanisms of considerable complexity, with components that are concentric and slide axially to double their length, which are expensive systems that take up a lot of space. Furthermore, the interior sheath which supports the plastic tubular pro forma, must be hot, requiring an accessory device to permit the recirculation of the hot fluid, further complicating the mould structure. Similarly, the mould is usually kept cold by an exterior bath of cooling fluid, while cooling of the shaped plastic tube is produced indirectly through contact with the mould resulting in an energy-inefficient system. Also, the method is time-consuming, because as the plastic has a coefficient of expansion which is greater than the metal, the mould and the plastic material in it quickly separate, impeding the transmission of heat by contact. The expansion is effected in at least two stages, which is a slow process which is subject to the displacement of the moving sheath.

Likewise, the introduction and removal of the tubes are made difficult by the presence of the sliding accessories. Consequently, the introduction and removal of the pro forma and tube are usually possible only at the same end of the mould, and the process cannot be linear, but requires back and forth movements of the material, which slows process and the logistics, as the time required for the introduction and removal of the pro formas does not permit the orientation and both actions cannot be carried out simultaneously.

Also, thermal performance may be poor in methods such as are described in FR 8115427; U.S. Pat. No. 4,499,045, WO 98/13190, as the mould is heated and cooled each time a tube is processed, implying a high consumption of energy, and a low efficiency as in the previous case, because, once again cooling is produced by contact. In this method, the tube is inserted cold, the actual mould acting as a heater and also as a mould, employing numerous orifices to permit the evacuation of the fluid which previously served to heat the tube, making the execution of the method more expensive.

BRIEF DESCRIPTION OF THE DRAWING

By way of example, and to assist in understanding the invention, one example embodiment of the invention is illustrated in the single FIGURE of the accompanying drawings, which shows a longitudinal cross-sectional view of equipment for the production of molecularly bioriented tubular profiles, and with reference to this figure, a related example method is also described:

DETAILED DESCRIPTION

Some example embodiments of the present invention include a mould which incorporates an expansion system, a cooling system and a vacuum system Conveniently, these elements can be synchronized to make execution and production of a molecularly bioriented tube or profile possible.

One application of some example embodiments of the present invention is being able to form molecularly oriented tubular profiles, in an executable process that is easy, quick and energetically efficient, permitting the reduction of costs and times in the production of the tubular profiles with respect to the systems that are currently used for the same purposes, so that the final product arrives on the market at a much more competitive price based.

Some example embodiments of the present invention can permit a simple, quick and energetically efficient molecular orientation, the equipment being less sophisticated and less expensive than conventional equipment, permitting a reduction of costs and processing times and permitting products to be brought to the market at a much more competitive price.

Some example embodiments of the present invention include a mould for the shaping of a plastic tube. The mould acts solely as a shaper and operates at a constant temperature, a hot temperature, and without requiring heat exchange between the mould and the tube.

The mould can be constantly heated with heating elements and at the ends thereof can include asymmetric heads, allowing the simultaneous insertion and extraction of a pro forma and an oriented tube, resulting in a saving of process time and permitting the use of pre-heated tubes made possible by the asymmetric geometry of the heads.

The heads can include a vacuum take-off which permits, prior to the shaping, the expansion of the tube or profile without having to make evacuation or drainage orifices in the mould for the fluid which surrounds the plastic tube and confines the mould. Also the heads can include a lubrication system comprising air cushioning or any other fluid, which permits smooth and quick extraction of the shaped tubes without needing strong mechanical elements.

Furthermore, in the mould, for example in the asymmetric heads, mechanical fasteners for the plastic tube and openings for the entrance of expansion and cooling fluids, and for the exit of the fluids, can be provided.

The plastic tube which is inserted into the mould, through one of the ends, rests on a generatrix on a lower part of the mould, to subsequently carry out the fastening of the corresponding head at the insertion end of the mould, so that the plastic tube can enter at a high temperature which permits the orientation thereof to be deformed. The mould is already hot when the plastic tube is inserted, so that no heat exchange is produced between the tube and the wall of the mould and, therewith, of the temperature in the pro forma tube.

On the other hand, the mould is mounted on a support that allows the rotation and/or tilting of the mould, in order to improve the cooling of the tubular profiles. The equipment can include auxiliary measurement and control systems.

Using the equipment including the mould and its ancillaries, an example production method may include:

Insertion of the plastic tube inside the mould, which has already been heated to prevent heat exchange between the plastic tube and the wall of the mould.

Closure of the head corresponding to the end of the mould through which the plastic tube has been inserted and actuation of the plastic tube fasteners so that the plastic tube remains fastened and immobilised inside the mould.

Application of vacuum inside the enclosure defined by the interior of the mould and the exterior of the plastic tube.

Application, by pumping or a pressurised tank system, of expander fluid to the interior of the plastic tube, maintained at the same temperature as the tube, to expand the tube against the walls of the mould.

Application to the interior of the plastic tube of a cooling fluid, through a pumping or pressurised tank system, with a return, to permit the continuous flow of the cooling fluid and the direct interaction of the cooling fluid with the inner walls of the expanded plastic tube.

Execution of oscillating and/or rotating movements of the mould during the cooling fluid application phase, with the object of ensuring a correct distribution of the temperature in the interior.

Depressurization and/or emptying of the inside of the plastic tube, once it has cooled, by connecting the inside of the plastic tube with atmosphere, or with an accumulator tank.

Application of a pressure-injected lubricating fluid to quickly and efficiently remove the plastic tube from the mould. Insertion or pressure injection of the lubricating fluid can produce a cushioning effect between the mould and the actual plastic tube, in order to reduce the force of removal.

As shown in the accompanying figure, the an example apparatus may include a mould (1) mounted on a support (2) which can rotate and tilt the mould (1). The mould (1) is externally equipped with a plurality of heating elements (3), and, at each end of the mould, an asymmetric head (4) equipped with a vacuum take-off orifice (5), the purpose of which will be explained below.

A corresponding plastic tube (6) to be shaped is inserted through one of the ends of the mould (1) prior to removing the corresponding head (4). The insertion of the plastic tube (6) is made until the plastic tube (6) reaches the head (4) at the opposite end of the mould (1) to subsequently mount that head (4) of the end through which the tube (6) has been inserted and actuate the corresponding fasteners (7) which hold the actual tube (6) inside the mould (1), with the plastic tube (6) resting in correspondence with the lower generatrix of the actual mould (1), as shown in the figure. The asymmetric heads (4) permit the pre-heated and, therefore, soft, plastic tube (6) to be supported and straight when entering the mould, facilitating gripping of the mould, at its ends by the fasteners (7).

In alignment with the fasteners (7) of the plastic tube (6), an inlet (8) and an outlet (9) for the expansion and cooling fluid are provided. Radially to the wall of the actual mould (1) an orifice (10) is provided for the entrance of lubricating fluid used in the removal of the tube (6) once the inside of the mould (1) has been shaped. Shaping can be effected by applying an initial vacuum, through the orifice (5) which is located in the limited enclosure defined between the inside of the mould (1) and the exterior of the plastic tube (6). By applying vacuum, good shaping can be obtained, as any water or air that may be present which could prevent the plastic from consistently sticking to the walls of the mould, is removed.

Next, the expander fluid is applied at the same temperature as the temperature of the pro forma and the mould, through the inlet (8) to expand the tube (6). Once plastic tube (6) has expanded, the expander fluid maintains the pressure inside the mould by means of regulation systems, a cooling fluid is applied to the actual tube (6), also through the inlet (8), permitting the leakage and pull of the expander fluid on the opposite side or on the same inlet side, through the outlet (9), permitting the continuous flow of the fluid and the direct interaction thereof against the inner walls of the plastic tube (6).

Simultaneously to that cooling, the mould (1) can be oscillated and/or rotated by the support (2), which is equipped to provide those movements, thereby achieving good temperature distribution within the mould.

After depressurizing and/or emptying the inside of the plastic tube (6) after the cooling thereof, pressurised lubricating fluid is applied through the lateral orifice (10). The pressurized fluid flows between the mould (1) and the plastic tube (6) providing a cushioning effect, which reduces the extraction forces. The lubricating fluid can be at the same temperature as the mould (1) in order to prevent changes of temperature.

As has been mentioned previously, based on this equipment and method, and by virtue of the double head (4) of the mould (1), it is possible to remove an already shaped plastic tube (6), at the same time that the next tube to be shaped is inserted at the opposite end of the mould (1). This arrangement reduces execution time and costs, as do the simplicity of the equipment employing the mould (1) and the elements associated thereto.

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. Equipment for producing molecularly bioriented tubular profiles, comprising:
    a mold heated by external heating elements;
    the mold including asymmetric heads at the ends of the mold,
    the asymmetric heads configured to allow insertion of a preheated plastic tube inside the hot mold, the preheated plastic tube resting on a lower generatrix of the mold and being disposed asymmetrically with respect to a central longitudinal plane of the mold,
    wherein the asymmetric heads include fasteners configured to fasten the plastic tube when the tube is inserted into the mold, an inlet for the application of expander fluid and cooling fluid inside the plastic tube , and an outlet for the expander fluid and the cooling fluid,
    the mold also having a lateral orifice configured to receive lubricating fluid between the mold and the tube to facilitate removal of the shaped tube;
    wherein the mold is mounted on a support which can tilt and rotate to distribute the temperatures inside the mold during cooling of the plastic tube.

2. The equipment for producing molecularly bioriented tubular profiles, according to claim 1, wherein the equipment is further configured so that the plastic tube to be shaped, upon insertion into the mold resting on the lower generatrix of the mold, defines an enclosure between the inside of the mold and the exterior of the plastic tube, the equipment further configured so that a vacuum is applied to the enclosure through the inlet in the asymmetric heads before the application of the expander fluid into the plastic tube.

3. The equipment for producing molecularly bioriented tubular profiles of claim 1, wherein the equipment is further configured to:
    heat the mold to a desired predetermined temperature;
    receive the plastic tube into the heated mold, the insertion being made through one of the ends of the mold and the plastic tube being at the same temperature as the mold;
    close the insertion end of the plastic tube with the corresponding asymmetric head and simultaneous actuation of the fasteners of the plastic tube inside the mold;
    receive application of vacuum to the enclosure defined between the interior of the mold and the exterior of the plastic tube;
    receive application of expander fluid through at least one inlet in the asymmetric heads, to expand the plastic tube, wherein the expander fluid is at the same temperature as the plastic tube, and wherein the expander fluid expands the plastic tube against the walls of the mold;
    receive application, through the at least one inlet in the heads, of a cooling fluid inside the plastic tube, and simultaneous evacuation of the cooling fluid through the outlet in the asymmetric heads to obtain a continuous flow of the cooling fluid and interaction of the cooling fluid with the inner walls of the expanded plastic tube;
    rotate and tilt the mold, simultaneously with cooling the plastic tube, to distribute the temperature in the interior of the plastic tube;
    depressurize or empty or both depressurize and empty the inside of the plastic tube, by connecting the inside of the plastic tube with the atmosphere; and
    receive through the lateral inlet orifice provided in the mold a pressurised lubricating fluid between the mold and the expanded plastic tube to reduce the force required for removal of the shaped plastic tube.

4. The equipment for producing molecularly bioriented tubular profiles of claim 3, wherein the equipment is further configured to, simultaneously with the removal of the shaped plastic tube through one of the ends of the mold, to receive into the mold through the opposite end a new plastic tube to be shaped.

5. An apparatus for producing molecularly bioriented tubular profiles, comprising:
    a mold heated by external heating elements;
    the mold having two ends and having asymmetric heads at the two ends, the heads configured to allow insertion into the mold of a preheated plastic tube, the preheated plastic tube resting on a lower generatrix of the mold and being disposed asymmetrically with respect to a central longitudinal plane of the mold;
    the asymmetric heads including fasteners configured to fasten the plastic tube when the plastic tube is inserted into the mold;
    the asymmetric heads having an inlet for the application of expander fluid and cooling fluid inside the plastic tube and an outlet for the expander fluid and cooling fluid;
    a support upon which the mold is mounted, the support being configured to tilt and rotate to facilitate a correct distribution of temperatures inside the mold while the tube is cooling; and
    a lateral inlet orifice in the mold configured to receive a pressurized lubricating fluid between the mold and the expanded plastic tube, the pressurized lubricating fluid reducing the force required for removal of the shaped plastic tube.

6. The apparatus of claim 5, wherein the apparatus is further configured so that the plastic to be shaped,
    upon insertion into the mold and resting on the lower generatrix defines an enclosure between the inside of the mold and the exterior of the plastic tube.

7. The apparatus of claim 6, wherein the apparatus is configured to receive a vacuum applied to the enclosure.

8. The apparatus of claim 7, wherein at least one of the asymmetric heads is configured to receive an expander fluid and, after application of the vacuum to the enclosure, to conduct the expander fluid into the interior of the plastic pipe.

9. The apparatus of claim 5, wherein the asymmetric heads are configured to receive a cooling fluid through the inlet and simultaneously permit evacuation of the fluid through the outlet to obtain a continuous flow of the cooling fluid and interaction of the cooling fluid with the inner walls of the expanded plastic tube.

10. The apparatus of claim 5, wherein the apparatus is configured to allow removal of a shaped plastic tube through one of the ends of the mold while receiving into the mold at the opposite end a new plastic tube to be shaped.

* * * * *